June 14, 1966 N. DELLA VALLE 3,255,550
LEADER RACK
Filed June 2, 1964
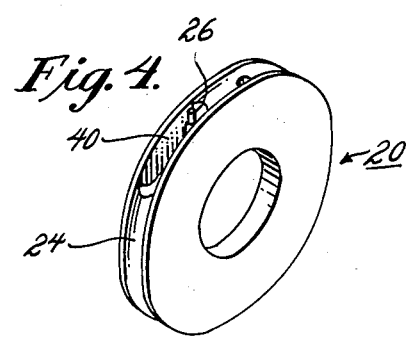
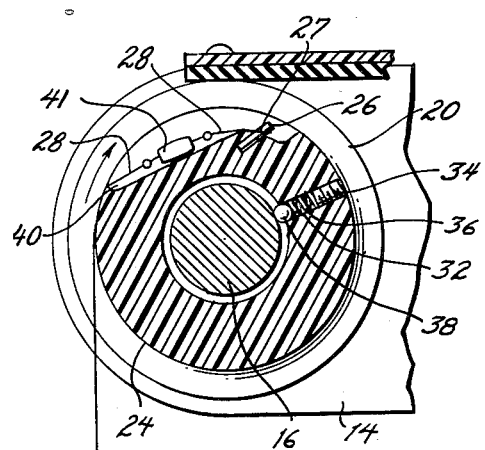
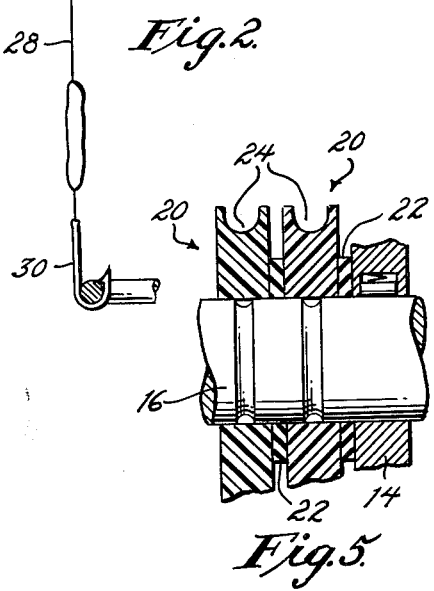
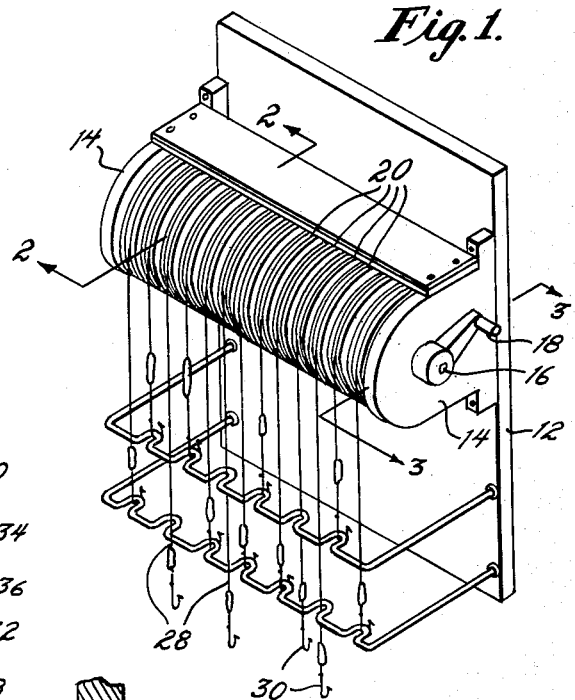
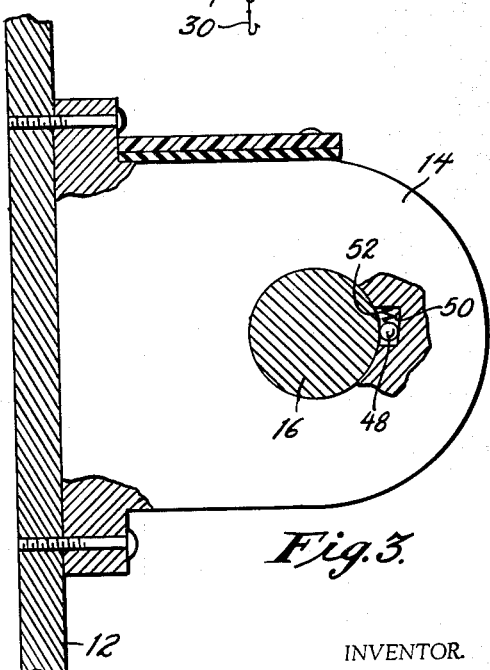
INVENTOR.
NEARO DELLA VALLE
BY
ATTORNEY.

3,255,550
LEADER RACK
Nearo Della Valle, Medford, N.J., assignor to Ridley Mfg. Company, Inc., Essington, Pa., a corporation of Pennsylvania
Filed June 2, 1964, Ser. No. 371,984
1 Claim. (Cl. 43—57.5)

This invention relates to a leader rack of the type disclosed in my prior Patent No. 3,032,914 of May 8, 1962.

The object of this invention is to produce an improved leader rack of the type set forth.

The rigs used to catch one kind of fish vary in length, and in other respects from those used for catching another kind of fish. For example, the rigs used for trolling for game fish are longer than those used for bottom fishing and so on. The fishing line is readily wound upon the usual fishing reel and, when the leader is shorter than the distance between the reel and the tip of the fishing rod, there is no problem because the hooks can be engaged with the cross bars of the reel or with the line guides carried by the rod. But when the leader is longer than space referred to, it must be disconnected and stored separately. It was to provide for such storage that I produced the invention covered by the patent aforesaid.

The structure disclosed in my patent is successful but I found that the rather bulky barrel of the swivel on the end of the line remote from the hook occupies a considerable portion of the space available for the winding of the leader so that when a leader is wound on the spool of my prior patent a hump will appear at the location where the barrel underlies turns of the leader. Also, I found that the means provided for limiting the torque to which each spool is subjected could be also improved. It is therefore a more specific object of this invention to produce a leader rack the spools of which are provided with recesses for receiving the barrels referred to and to provide improved means for limiting the torque to which the individual spools are subjected.

The full nature of the invention will be understood from the following specifications and the accompanying drawings in which:

FIG. 1 is a perspective view of a leader rack embodying the invention.

FIG. 2 is enlarged sectional view looking in the direction of line 2—2 on FIG. 1.

FIG. 3 is an enlarged sectional view looking in the direction of line 3—3 in FIG. 1.

FIG. 4 is a perspective view of one of the spools shown detached.

FIG. 5 is a fragmentary sectional view showing details of construction.

Except for the improvements hereafter noted, the structure of the leader rack of the present disclosure may be the same as that shown in my patent aforesaid. But to make reference to said patent unnecessary, the essentials of the structure of the prior patent are now briefly described.

The leader rack to which my invention is applicable includes a panel of other support 12 to which bearing plates 14 which rotatably support shaft 16 may be secured. Shaft 16, which is rotatable by means of a handle 18, carries a number of spools 20 which are preferably held apart by spacers 22 whereby each of the spools is rotatable about shaft 16 independently of all of the other spools. Each of the spools is provided with a continuous peripheral groove 24, which is interrupted by a pin 26 and which is adapted to receive a loop 27 at the end of the leader 28 remote from hook 30. Groove 24 is deep enough to accommodate all of the turns of the leader and, according to the present invention it is provided with a bore 32 for receiving a screw 34, a spring 36 and a ball 38 which bears against shaft 16 with a pressure which is a function of the tension of the spring. This arrangement replaces the torque limiting screw which, in the prior patent, pushed a friction pad against the shaft and was difficult to adjust and which wore out from time to time.

Rotation of the shaft in leader unwinding direction is prevented by means of a ball 48 which is placed in a notch 50 formed in one of bearing plates 14. Notch 50 is tapered and ball 48 is urged into the narrow portion of the notch by spring 52 whereby rotation of the shaft in clockwise direction in FIG. 3 jams the shaft against the ball and stops rotation of the shaft, and vice versa.

In order to accommodate the barrel of swivel 41 at the end of the fishing line remote from the hook, I provide groove 24 with a recess 40 which is disposed adjacent pin 26 whereby when the end of the line remote from the hook is engaged with pin 26, the swivel will lie in recess 40 so as to form a continuation of the surface on which the leader is wound.

What I claim is:

A rack for storing a fishing leader of the type which has a hook at one end thereof, a swivel connected at one end thereof to the other end of said leader, and a loop connected to the other end of the swivel, said rack including a shaft,
bearing means rotatably supporting said shaft,
a handle for rotating said shaft,
a spool carried by said shaft and having a surface for receiving a leader wound thereon,
friction means operatively connecting said spool with said shaft,
said friction means comprising:
a thread bore formed radially through said spool and leading from the periphery of said spool to said shaft,
a ball in said bore engaging said shaft, and
an adjustment screw engaging said bore for applying pre-determined pressure to said ball,
there being a recess in the leader receiving surface sufficient to accommodate the swivel whereby the surface of the swivel constitutes a continuation of said leader receiving surface.

References Cited by the Examiner

UNITED STATES PATENTS

| | | |
|---|---|---|
| 2,508,820 | 5/1950 | Fraley. |
| 2,902,790 | 9/1959 | Harvey _____ 43—26 |
| 3,032,914 | 5/1962 | Valle _____ 43—57.5 |

SAMUEL KOREN, *Primary Examiner.*

R. L. HOLLISTER, *Assistant Examiner.*